Aug. 20, 1935.　　　　　L. H. HYDE　　　　　2,011,581
SCREEN ADVERTISING APPARATUS
Filed July 19, 1933

FIG. 1-A

INVENTOR.
LORING H. HYDE
BY
ATTORNEY

Patented Aug. 20, 1935

2,011,581

UNITED STATES PATENT OFFICE 2,011,581

SCREEN ADVERTISING APPARATUS

Loring H. Hyde, Los Angeles, Calif., assignor to Consolidated Advertising Corp., Ltd., Los Angeles, Calif.

Application July 19, 1933, Serial No. 681,122

5 Claims. (Cl. 88—24)

This invention relates to motion picture projection and screen display.

More particularly the invention relates to a dual or composite display of motion picture feature film projection and screen advertising, there being a portion of the main screen which is utilized whereon to project the advertising matter which heretofore has consisted of an opacity margin and has been made to serve no useful purpose. It is one of the important objects of this invention to dedicate this waste space to a more useful end. At the present time exhibitors everywhere are in great need of extra revenue as well as better patronage support from their local merchants.

Especially is this true in the smaller cities and towns where great numbers of theatres have been compelled to close by the force of circumstance, who could have remained open on a profitable basis if they could have had an additional income of some twenty to one hundred dollars per month procurable thru advertising.

The opportunity to procure this extra income is provided by the present invention, because the merchants who are using this method of advertising are interested in the theatre from several standpoints. They like to see their own advertisements displayed on the screen, and therefore will be more likely to attend bringing their families with them. Furthermore the merchants will boost the show and influence others to attend, as they naturally wish every possible prospective patron to see the show and consequently witness their advertising which is being displayed there. This, of course, increases box office receipts in addition to swelling the revenue accruing from advertising previously secured by the theatre owner.

The theatre, for the masses of the people, is the center of their evening's amusement. Here the buying power of the community is represented by the people comprising the audience, all in a relaxed frame of mind, receptive to new ideas and suggestions. At the picture show the business and professional enterprises of the community have a wonderful opportunity for producing favorable publicity effects. The theatre can display advertising for local merchants while the regular entertainment is proceeding on the screen. A merchant owning a small business, who could scarcely afford any other form of advertising may, therefore, participate and be benefited while at the same time further increasing the prosperity of all local business. This will logically result because the buying power of the people comprising the theatre audience will greatly stimulate and distribute purchases on a wider circle, meaning greater average prosperity.

This display of advertising matter is afforded thru the utilization of the marginal portion of the main screen, just outside of the screen area that is occupied by the entertainment picture. The display being in the marginal range of the theatre screen constitutes the nature of a double presentation shown simultaneously. There is no wasted time or lost motion. The advertising is presented through the use of an auxiliary slide or stereopticon form of projector, in the present embodiment, on the lower portion of the screen.

A further object of my invention is to combine publicity and entertainment which on account of the simplicity of the device will enable a merchant to secure advertising at a very low rate.

Still another object of the invention is to utilize the auxiliary projection machine or stereopticon machine for the purpose of displaying advertising matter or the like simultaneously with the showing of other scenes or effects on the main screen area, thereby saving time and eliminating annoyance on the part of the audience being required to sit thru a period of showing where only advertising is the amusing feature.

The objects of the invention are, in part, carried out by setting apart an offset marginal portion of the screen and in combination therewith providing improved mechanism whereby this marginal or subsidiary area may be changed from opacity to silver and vice versa at will by the projectionist in the projecting room.

Yet other objects of an important nature will reveal themselves when the specification and claims have been set forth in detail with the accompanying drawing showing one embodiment of the invention and wherein—

Fig. 1A is a fragmentary perspective view of the screen and stage portion. This view is intended to show a modified relative arrangement of the main and auxiliary silver screens.

Figure 1:
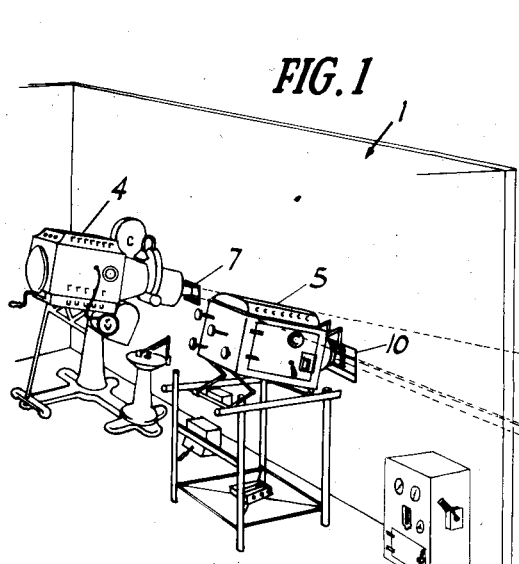
Fig. 1 is a perspective view showing a projection room with the usual accoutrements ordinarly employed, a stage portion and the theatre screen whereon the pictures are projected and illustrating the means whereby the apparatus is used to produce the screen advertising and principal feature in unison.
Figure 2:
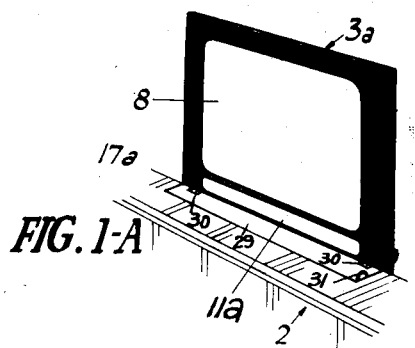
Fig. 2 is a fragmentary view of the main feature film.
Figure 2:
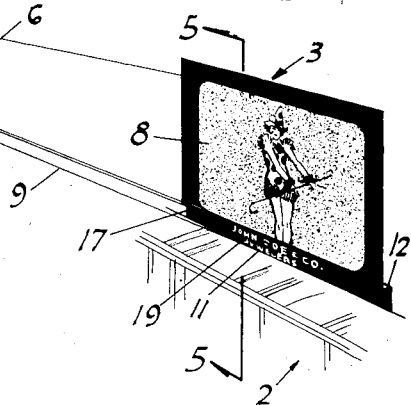
Figure 2:

For the purpose of disclosure I show somewhat diagrammatically a preferred embodiment consisting of a projection room 1, a stage portion 2, and a screen 3 in the general arrangement in a theatre.

The projection room is equipped, among other things, with a pair of projecting machines 4 and 5, and the projection rays 6 extend from the main machine 4 thru the aperture 7 on to the silver portion 8 of the main screen 3, and the projection rays 9 extend from the auxiliary machine 5 thru the aperture 10 on to the silver portion 11 of the advertising of subsidiary screen 17. This arrangement has been adopted for disclosure purposes, it being understood the particular machine which is not being employed to project on the main screen is held and equipped in readiness to be brought into play so that an unbroken continuity of picture presentation is assured the audience as soon as the screening of the picture is completed. It is the auxiliary machine which may be utilized at all times for projecting the advertising matter on to the advertising screen.

On a line 12, approximately coinciding with the lower silvered portion of the screen 3, said screen is offset and extended backwardly sufficiently to form a ledge 13 which is provided with a slot 14 thru which the opaque curtain 15 winds and unwinds, there being a portion of said ledge which is also extended sufficiently to form integrally therewith a motor platform 16. Extending downwardly to the floor of the stage from a point rearwardly of said slot is the advertising screen 17.

When the silvered portion 11 of said advertising screen 17, whereon the advertising matter 19 is projected, is not being used, the curtain 15 is lowered in order that an opaque margin will always appear completely around the main screen. The platform 16 may be braced to the advertising screen, as at 20, to rigidify the motor platform.

The opaque curtain 15 extends the full width of the silvered portion of the advertising screen and winds up and unwinds upon a shaft 21. Said shaft provides means whereon to mount the pulley 22 which may be operated thru the medium of the belt 23 connected to the motor 24. On the lower portion of the curtain is provided a weight 25 which keeps the curtain 15 taut. Said weight may occupy a portion of the slot 14 when the curtain is fully raised.

The motor 24 is energized from any convenient source thru leads 26 and 27, and there is provided a reversing switch 28 for operating the motor. Or the motor may consist of the type wherein a rotary expanding governor is employed and there may be a switch in the circuit in which the motor is included to operate said governor, said governor upon expanding, increasing its orbit to close the switch and circuit and upon contracting, diminishing its orbit to open the switch and circuit. There may also be a second switch to cause a reverse operation of the motor subsequent to each starting thereof and means driven by the motor to operate the second switch.

Such an arrangement may be employed to advantage whereby the operation of the opaque curtain is controlled entirely by the projectionist in the projecting room. Such an arrangement being old in the art no claim per se is made thereto.

The advertising screen 17 is shown offset primarily for two reasons. To afford an easy means for lowering an opaque curtain in front thereof so as to effectively obscure the advertising screen when it is not being used. Secondly to provide a satisfactory background whereon the range of vision of an individual may be extended with but slight change of focus from the main screen.

The advertising matter 19 will be shown on the advertising screen without flicker and will consist of simplified advertising matter which will fade into and out of view without in any manner detracting one's attention abruptly from their concentrated thought on the main picture.

Moreover this advertising matter will appear casually in such sequence that one will be unaware when a change takes place and may be likened somewhat to the permanent advertising formerly printed adjacent to and surrounding the silvered portion of the screen which subsequently was supplanted by the opaque margin.

It will therefore be obvious that this form of advertising may be projected on the subsidiary screen simultaneously with the projecting of the feature picture on the main screen without the interference of one with the other. With the projection equipment already on hand, the remaining apparatus may be installed with slight cost but yet will meet a long felt need.

Figure 3:
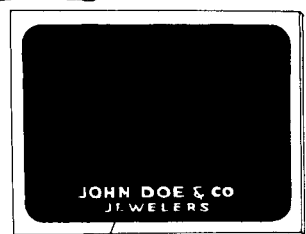
Fig. 3 is a view of the advertising slide. The principal portion of the slide shown is of an opaque nature so as not to interfere with the showing of the main picture.
Figure 4:
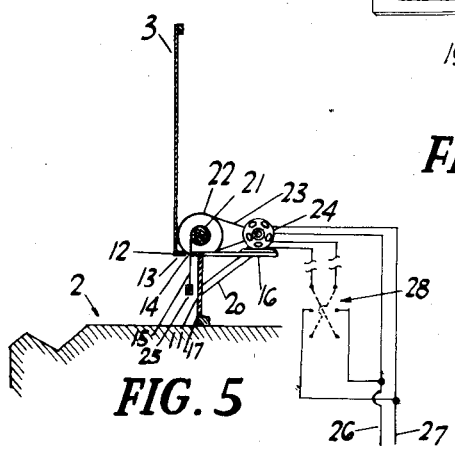
Fig. 4 is a face view of the screen shown in the right hand portion of Fig. 1.
Figure 5:
Fig. 5 is a transverse section, taken on line 5—5 of Fig. 1. Means are also shown whereby the opaque curtain covering the silvered portion of the advertising screen may be operated to obscure the silver portion while the latter screen is not being used.

Although I show a slide in Fig. 3 on a relatively narrow portion of which is printed the advertising matter 19, it is deemed within the province of this invention to use in place of said slide an ad film for the secondary machine when occasion warrants, or a "trailer" which may be attached to and follow the screening of a feature film. Therefore the invention contemplates as an article of manufacture either a slide or an advertising film which will be composed of advertising matter alone, and that advertising matter placed on a relatively narrow portion in each case with the remaining portion left opaque.

A brief résumé and description of the operation of the apparatus will now be given.

Incident to the projecting of the rays 6 and 9 upon the screens 8 and 11, it is presupposed the projectionist will have elevated the opaque curtain 15 by means of the motor 24, thus bringing the silvered portion 11 of the advertising screen 17 into view.

The machine 4 is provided with the feature run and the screening of this event takes place on the silvered portion 8 of the main screen 3.

The screening of the advertising matter 19 may precede or follow or be simultaneously shown with the screening of the events on the main screen.

The advertising matter will, when it is once displayed, remain on the advertising screen for a considerable time. It will, however, be limited somewhat since the heat will in time cause the emulsion on the slide to liquefy. For this reason a time limit of ten minutes may be given to each slide advertising display.

Since that portion of the slide which ordinarily would show on the screen 8 is of an opaque nature there will be no interference between the filming of the main feature and the display of the advertising matter. When all the ad displays have been shown the silvered portion of the advertising screen may be obscured as it will be of no further use during the show.

In the modification shown in Fig. 1A, the lower marginal portion 17a of the main screen 3a is not shown offset, said marginal portion being silvered and thus except for not being offset, being related to the main screen in the same way as the corresponding part of the screen structure shown in Fig. 1.

Describing Fig. 1A further, means for obscuring the silvered portion 11a of the advertising screen 17a, corresponding to the silvered portion 11 of the screen 3, comprises a panel 29 which is hinged to the bottom edge of the screen 3a by means of hinges 30. Said panel is operable by means of the handle 31 from full line position to dotted line position. When this panel 29 is in the latter position the screen 3a will have the marginal portion showing entirely opaque since the face of the panel which is down is painted black. The latter construction gives rise to the thought of a still further modification of the advertising screen wherein it may be hinged along the dotted line and folded rearwardly while not in use to conceal its silvered face. The main screen could be lowered to close up the resulting gap therebeneath.

I claim:

1. In a moving picture apparatus, a main screen, a subjacent screen offset rearwardly from said main screen, a curtain operating device located rearwardly of said main screen, and a curtain in front of said subjacent screen and operable by said device.

2. In a moving picture apparatus, the combination with the main screen, of a subsidiary screen rearwardly adjacent thereto having a silvered portion, a ledge joining the lower portion of the main screen with the top portion of said subsidiary screen and extending rearwardly of said main screen, there being a slot thru said ledge, a shaft at a higher level than said slot, a curtain windable upon said shaft and operable thru said slot to obscure or expose the silvered portion of said subsidiary screen, said silvered portion being positioned to have advertising matter projected thereupon simultaneously with the projection of a picture on the main screen.

3. The combination, with the main screen having a relatively narrow marginal portion provided with a silvered screen adjacent thereto and a projection medium for projecting a showing on said main screen; of an auxiliary projecting machine arranged to project pictures in alternation with said projection medium, a slide having an opaque body portion and a relatively narrow marginal portion whereon advertising matter is inscribed insertable in said auxiliary machine for showing the advertising matter on the slide on said advertising screen simultaneously with the showing on the main screen, the opaque portion of the slide masking off undesirable light from the auxiliary machine on aforesaid main screen during the operation of said projection medium.

4. The combination, with the main screen having a relatively narrow marginal portion provided with a silvered screen area adjacent thereto, and a projection machine containing a motion picture film having a series of scenes for projecting on aforesaid main screen; of an auxiliary projecting machine for motion pictures operating for the projection of motion pictures on said main screen in alternation with the first mentioned projection machine containing a picture slide having an opaque portion and a relatively narrow margin spaced apart in such a manner that when projected it will lie properly on the narrow screen within the boundary provided thereby, said opaque portion of the slide obscuring the light rays from the auxiliary machine on the area utilized by the showing of the scenes of the picture film.

5. A main picture screen consisting of a silvered portion whereon to project a feature picture and one portion which borders upon said silvered portion, the greater part of said border portion being opaque at all times, a part of said border portion being normally silvered to form a relatively narrow advertising screen whereon to project advertising matter simultaneously with the projection of a feature picture on the silvered portion of the main screen, a projection machine for projecting the feature picture on the main screen, and an auxiliary machine equipped in readiness to project a feature picture on the main screen when the showing of the film in the first said machine has been completed without breaking the continuity of the showing, means to project advertising matter on the ad screen from the auxiliary machine at will during the interim the first said projection machine is projecting a picture on the main screen, said means including a slide, the body portion of which is opaque whereby to mask the light from the auxiliary machine from interfering with the showing on the main screen, said slide having a relatively narrow portion containing advertising matter and said advertising matter being projectable on the silver screen formed in the border adjacent the border portion of the main screen by said auxiliary machine.

LORING H. HYDE.